United States Patent
Takagishi et al.

(10) Patent No.: US 9,349,389 B2
(45) Date of Patent: May 24, 2016

(54) MAGNETIC RECORDING HEAD AND MAGNETIC RECORDING AND REPRODUCING DEVICE

(71) Applicant: KABUSHIKI KAISHA TOSHIBA, Tokyo (JP)

(72) Inventors: Masayuki Takagishi, Tokyo (JP); Kenichiro Yamada, Tokyo (JP); Tomoyuki Maeda, Kanagawa (JP); Katsuya Sugawara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/809,494

(22) Filed: Jul. 27, 2015

(65) Prior Publication Data

US 2016/0035373 A1 Feb. 4, 2016

(30) Foreign Application Priority Data

Jul. 30, 2014 (JP) ................. 2014-155286

(51) Int. Cl.
*G11B 5/127* (2006.01)
*G11B 5/11* (2006.01)

(52) U.S. Cl.
CPC ............... *G11B 5/11* (2013.01); *G11B 5/1278* (2013.01)

(58) Field of Classification Search
CPC ........... G11B 5/127; G11B 5/33; G11B 5/147
USPC ............... 360/125.3, 125.03, 125.09, 125.04, 360/125.17, 125.12, 125.06, 125.15, 360/125.26, 125.19
See application file for complete search history.

(56) References Cited

U.S. PATENT DOCUMENTS

| 8,542,463 | B2 | 9/2013 | Guan | |
|---|---|---|---|---|
| 8,705,206 | B1* | 4/2014 | Maeda | G11B 5/23 360/119.04 |
| 2011/0058277 | A1 | 3/2011 | de la Fuente et al. | |
| 2011/0249359 | A1 | 10/2011 | Mochizuki et al. | |
| 2012/0314324 | A1* | 12/2012 | Guan | G11B 5/1278 360/123.12 |
| 2013/0028058 | A1* | 1/2013 | Yasui | G11B 5/1278 369/13.14 |
| 2013/0057981 | A1* | 3/2013 | Urakami | G11B 5/1278 360/125.03 |

(Continued)

FOREIGN PATENT DOCUMENTS

| JP | 2011-060412 | 3/2011 |
|---|---|---|
| JP | 2011-222112 | 11/2011 |

(Continued)

*Primary Examiner* — Allen T Cao
(74) *Attorney, Agent, or Firm* — Finnegan, Henderson, Farabow, Garret & Dunner LLP

(57) ABSTRACT

According to one embodiment, a magnetic recording head records information in a magnetic recording medium by shingled magnetic recording. The magnetic recording head includes a magnetic pole and a shield opposing the magnetic pole. The magnetic pole has a shield-opposing surface opposing the shield. The shield-opposing surface includes a first portion and a second portion. A position of the second portion in a track width direction is different from a position of the first portion in the track width direction, the track width direction intersecting a first direction from the magnetic pole toward the shield. The first portion records the information in the magnetic recording medium after the second portion in the shingled magnetic recording. A first distance between the first portion and the shield is shorter than a second distance between the second portion and the shield. The shield-opposing surface is tilted with respect to the first direction.

19 Claims, 8 Drawing Sheets

(56) References Cited

U.S. PATENT DOCUMENTS

2014/0098442 A1    4/2014  Edelman
2014/0177091 A1*   6/2014  Urakami .............. G11B 5/1278
                                                        360/75

FOREIGN PATENT DOCUMENTS

| | | |
|---|---|---|
| JP | 2013-004164 | 1/2013 |
| JP | 2014-078311 | 5/2014 |

* cited by examiner

_US 9,349,389 B2_

MAGNETIC RECORDING HEAD AND MAGNETIC RECORDING AND REPRODUCING DEVICE

CROSS-REFERENCE TO RELATED APPLICATIONS

This application is based upon and claims the benefit of priority from Japanese Patent Application No. 2014-155286, filed on Jul. 30, 2014; the entire contents of which are incorporated herein by reference.

FIELD

Embodiments described herein relate generally to a magnetic recording head and a magnetic recording and reproducing device.

BACKGROUND

Information is recorded in a magnetic recording medium such as a HDD (Hard Disk Drive), etc., using a magnetic recording head. For example, perpendicular magnetic recording is advantageous for high-density recording. It is desirable to increase the recording density for the magnetic recording head and a magnetic recording and reproducing device.

DETAILED DESCRIPTION

Figure 1:
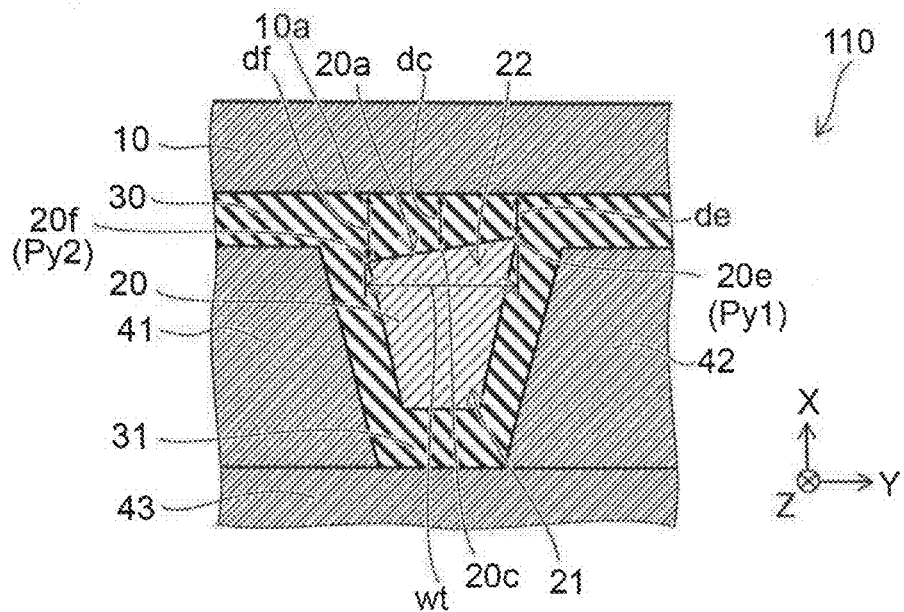
FIG. 1 is a schematic plan view showing a magnetic recording head according to a first embodiment.

According to one embodiment, a magnetic recording head records information in a magnetic recording medium by shingled magnetic recording. The magnetic recording head includes a magnetic pole and a shield opposing the magnetic pole. The magnetic pole has a shield-opposing surface opposing the shield. The shield-opposing surface includes a first portion and a second portion. A position of the second portion in a track width direction is different from a position of the first portion in the track width direction, the track width direction intersecting a first direction from the magnetic pole toward the shield. The first portion records the information in the magnetic recording medium after the second portion in the shingled magnetic recording. A first distance between the first portion and the shield is shorter than a second distance between the second portion and the shield. The shield-opposing surface is tilted with respect to the first direction.

According to one embodiment, a magnetic recording head records information in a magnetic recording medium. The magnetic recording head includes a magnetic pole and a shield opposing the magnetic pole. The magnetic pole has a shield-opposing surface opposing the shield. The shield-opposing surface includes a first portion and a second portion. A position of the second portion in a track width direction is different from a position of the first portion in the track width direction. The track width direction intersects a first direction from the magnetic pole toward the shield. The magnetic recording medium includes first to third regions arranged in the track width direction. The second region is disposed between the first region and the third region. The magnetic pole controls a direction of a magnetization of the first region by the first portion opposing the first region at a first time. The magnetic pole controls a direction of a magnetization of the second region by the second portion opposing the second region at the first time. The magnetic pole controls the direction of the magnetization of the second region by the first portion opposing the second region at a second time after the first time. The magnetic pole controls a direction of a magnetization of the third region by the second portion opposing the third region at the second time. A first distance between the first portion and the shield is shorter than a second distance between the second portion and the shield. The shield-opposing surface is tilted with respect to the first direction.

According to one embodiment, a magnetic recording and reproducing device includes one of the above magnetic recording heads and a magnetic recording medium. The magnetic recording medium is a perpendicular magnetic recording medium.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

FIG. 1 is a schematic plan view illustrating a magnetic recording head according to a first embodiment.

FIG. 1 is a plan view of the magnetic recording head 110 at a medium-opposing surface described below.

As shown in FIG. 1, the magnetic recording head 110 according to the embodiment includes a magnetic pole 20 and a shield 10. The magnetic pole 20 records information in a magnetic recording medium. The shield 10 is a trailing shield.

The shield 10 has a magnetic pole-opposing surface 10a. The magnetic pole-opposing surface 10a opposes the magnetic pole 20.

The magnetic pole 20 has a shield-opposing surface 20a. The shield-opposing surface 20a opposes the shield 10. In other words, the magnetic pole-opposing surface 10a and the shield-opposing surface 20a oppose each other.

A first direction from the magnetic pole 20 toward the shield 10 is an X-axis direction. For example, the X-axis direction corresponds to the down-track direction in the case where the skew angle is zero. One direction perpendicular to the X-axis direction is taken as a Y-axis direction. The Y-axis direction is the track width direction. A direction perpendicular to the X-axis direction and the Y-axis direction is taken as a Z-axis direction. The Z-axis direction is the height direction. The skew angle is the angle between the down-track direction and the direction from the magnetic pole 20 toward the shield 10.

In the example, the shield-opposing surface 20a is tilted with respect to the first direction. As described below, a portion of the shield-opposing surface 20a may be tilted with respect to the first direction. On the other hand, the magnetic pole-opposing surface 10a is perpendicular to the first direction.

A gap insulating unit 30 is provided between the magnetic pole 20 and the shield 10. A first side shield 41 and a second side shield 42 are further provided in the example. The magnetic pole 20 is disposed between the first side shield 41 and the second side shield 42. A shield 43 is further provided in the example. The first side shield 41, the second side shield 42, and the magnetic pole 20 are disposed between the shield 10 and the shield 43. An insulating unit 31 is provided between the shield 43 and the magnetic pole 20. The gap insulating unit 30 and the insulating unit 31 include, for example, materials including oxides of aluminum.

For example, in the case where the first side shield 41 and the second side shield 42 are provided in the magnetic recording head 110, the direction connecting the first side shield 41 and the second side shield 42 corresponds to the track width direction.

The shield-opposing surface 20a of the magnetic pole 20 includes a first portion 20e and a second portion 20f.

A position Py2 of the second portion 20f in the track width direction (the Y-axis direction) intersecting the first direction from the magnetic pole 20 toward the shield 10 is different from a position Py1 of the first portion 20e in the track width direction. For example, the first portion 20e includes one end in the track width direction (the Y-axis direction). For example, the second portion 20f is separated from the first portion 20e in the track width direction. In the example, the second portion 20f is the other end in the track width direction.

The shield-opposing surface 20a of the magnetic pole 20 further includes a central portion 20c. The central portion 20c is positioned between the first portion 20e and the second portion 20f.

Because the shield-opposing surface 20a is tilted with respect to the first direction, a first distance de between the first portion 20e and the shield 10 is different from a second distance df between the second portion 20f and the shield 10. In the example, the first distance de is shorter than the second distance df.

In the example, a third distance dc between the central portion 20c and the shield 10 is a distance between the first distance de and the second distance df.

In the example as shown in FIG. 1, the configuration of the magnetic pole 20 cut in the X-Y plane is a substantially trapezoidal configuration. In other words, the magnetic pole 20 includes a first end region 21 and a second end region 22. The second end region 22 is provided between the first end region 21 and the shield 10. The width of the second end region 22 in the track width direction (the Y-axis direction) is wider than the width of the first end region 21 in the track width direction. Thereby, for example, the off-track characteristics are good in the case where the skew angle is nonzero.

A width wt (the distance between the position Py1 and the position Py2) in the track width direction of the shield-opposing surface 20a of the magnetic pole 20 is, for example, not less than 1.0 times and not more than 2.0 times the track pitch.

Figure 2:
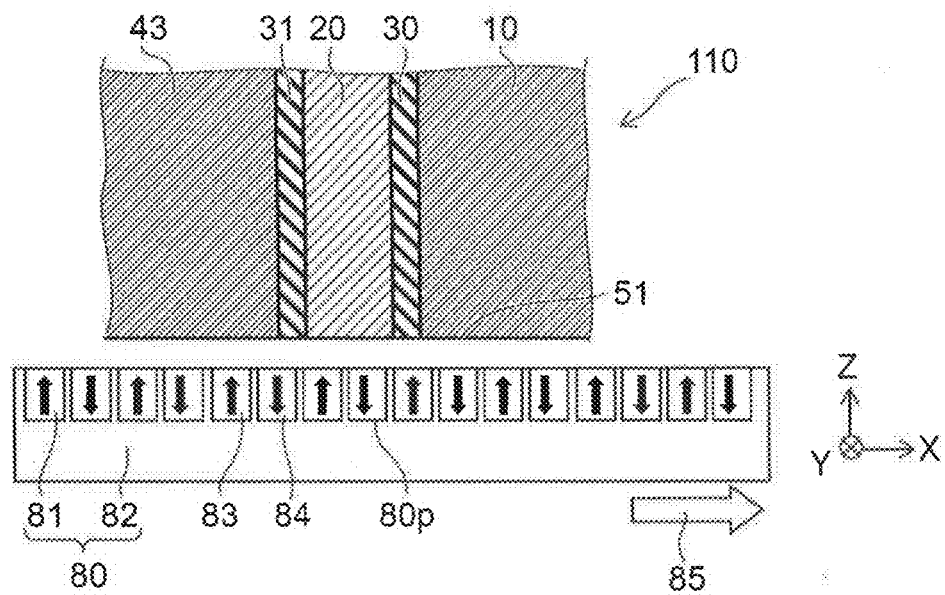
FIG. 2 is a schematic cross-sectional view showing the magnetic recording head according to the first embodiment.

FIG. 2 is a schematic cross-sectional view illustrating the magnetic recording head according to the first embodiment.

The magnetic recording head 110 is disposed to oppose a magnetic recording medium 80 (e.g., a magnetic disk, etc.). The magnetic recording head 110 has a medium-opposing surface 51 (an Air Bearing Surface (ABS)).

The track width direction (the Y-axis direction) is parallel to the medium-opposing surface 51 provided in the magnetic recording head 110 and perpendicular to the first direction from the magnetic pole 20 toward the shield 10. The magnetic recording medium 80 includes, for example, a medium substrate 82, and a magnetic recording layer 81 provided on the medium substrate 82. Multiple recorded bits 84 are provided in the magnetic recording layer 81. The magnetic recording medium 80 moves relative to the magnetic recording head 110 along a medium movement direction 85. The medium movement direction 85 corresponds to the direction (the first direction) from the magnetic pole 20 toward the shield 10.

A designated portion 80p of the magnetic recording medium 80 opposes the shield 10 after opposing the magnetic pole 20.

A magnetization 83 of each of the multiple recorded bits 84 is controlled by a magnetic field applied from the magnetic recording head 110. Thereby, the recording operation of the information is implemented.

A reproducing unit (not shown) that senses the direction of the magnetization 83 may be further provided in the magnetic recording head 110.

Figure 3:
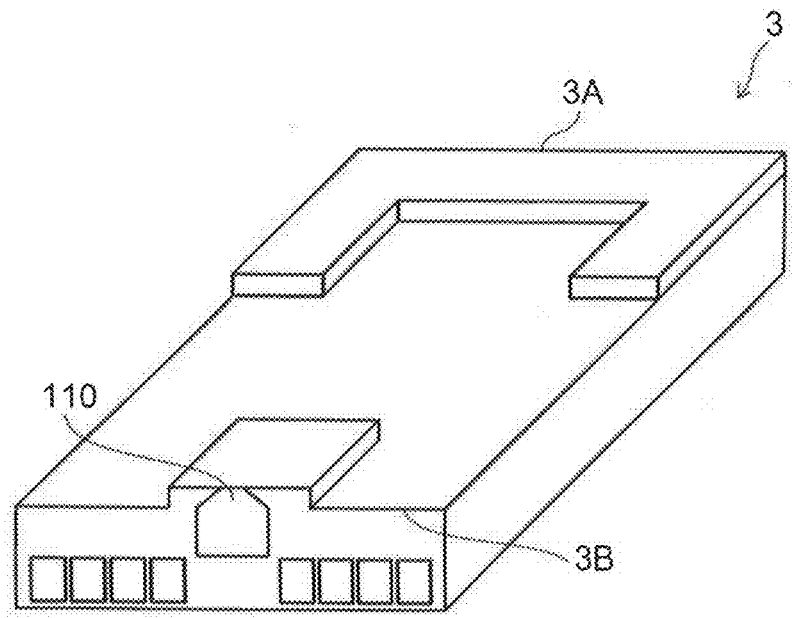
FIG. 3 is a schematic perspective view showing a head slider to which the magnetic recording head according to the first embodiment is mounted.

FIG. 3 is a schematic perspective view illustrating a head slider to which the magnetic recording head according to the first embodiment is mounted.

The magnetic recording head 110 is mounted to the head slider 3. The head slider 3 includes, for example, $Al_2O_3$/TiC, etc. The head slider 3 moves relative to the magnetic recording medium 80 while flying over or contacting the magnetic recording medium 80.

The head slider 3 has, for example, an air inflow side 3A and an air outflow side 3B. The magnetic recording head 110 is disposed at the side surface of the air outflow side 3B of the head slider 3 or the like. Thereby, the magnetic recording head 110 that is mounted to the head slider 3 moves relative to the magnetic recording medium 80 while flying over or contacting the magnetic recording medium 80.

The magnetic recording head 110 according to the embodiment records the information in the magnetic recording medium 80 by shingled magnetic recording (SMR).

Figure 4:
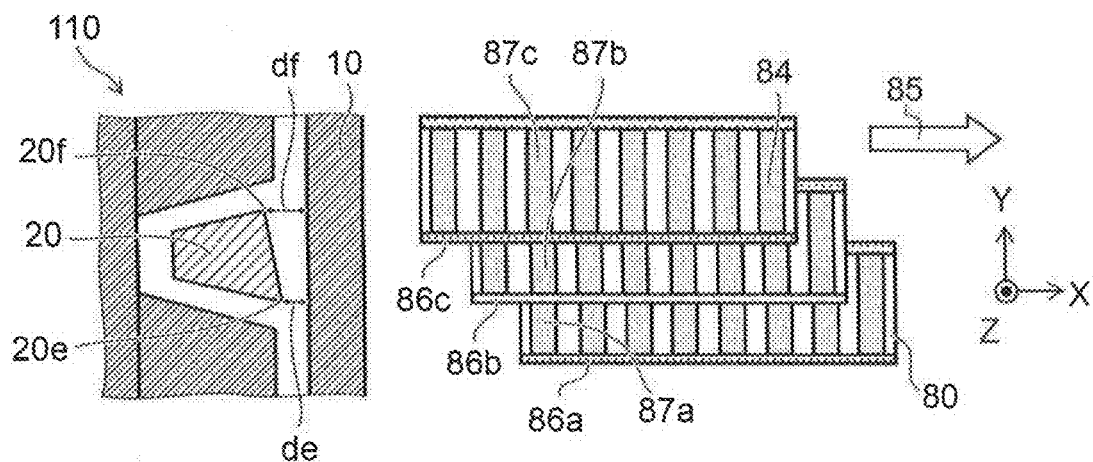
FIG. 4 is a schematic plan view showing an operation of the magnetic recording head according to the first embodiment.

FIG. 4 is a schematic plan view illustrating an operation of the magnetic recording head according to the first embodiment. FIG. 4 illustrates the state of shingled magnetic recording. The information is recorded at a first position 86a of the magnetic recording medium 80. Subsequently, the information is recorded at a second position 86b. Subsequently, the information is recorded at a third position 86c.

For example, the magnetic recording medium 80 includes first to third regions 87a to 87c arranged in the track width direction. The second region 87b is disposed between the first region 87a and the third region 87c.

At a first time, the first portion 20e opposes the first region 87a. The magnetic pole 20 controls the direction of the magnetization 83 of the first region 87a. At the first time, the second portion 20f opposes the second region 87b. The magnetic pole 20 controls the direction of the magnetization 83 of the second region 87b.

At a second time after the first time, the first portion 20e opposes the second region 87b. The magnetic pole 20 controls the direction of the magnetization 83 of the second region 87b. At the second time, the second portion 20f opposes the third region 87c. The magnetic pole 20 controls the direction of the magnetization 83 of the third region 87c.

Thus, the information is recorded multiple times to one region of the magnetic recording medium 80.

In the shingled magnetic recording, the first portion 20e records the information in the magnetic recording medium 80 after the second portion 20f. In other words, the first portion 20e records the information over the information recorded by the second portion 20f in the region where the second portion 20f recorded the information.

In the embodiment, the distance (the first distance de) between the shield 10 and such a first portion 20e is set to be shorter than the distance (the second distance df) between the second portion 20f and the shield 10.

In the embodiment, the recording density can be increased by setting the recording gap (the first distance de) to be narrow for the first portion 20e that records subsequently in the shingled magnetic recording.

For example, there is a reference example in which the distance between the magnetic pole 20 and the shield 10 is set to be narrow over the entire magnetic pole 20. In such a case, the magnetic field shorts between the magnetic pole 20 and the shield 10 and does not easily reach the magnetic recording medium 80. Therefore, the magnetic field gradient at the magnetic recording medium 80 is good; but a sufficient magnetic field strength is not obtained; and as a result, it is difficult to increase the recording density.

Conversely, in the embodiment, the recording gap of the first portion 20e that records subsequently in the shingled magnetic recording is set to be narrower than the recording gap of the second portion 20f. Therefore, the magnetic field can be concentrated at the portion that ultimately remains in the shingled magnetic recording. Accordingly, the magnetic field gradient can be improved while maintaining the magnetic field strength. Thereby, the recording density can be increased.

According to the embodiment, a high density magnetic recording head can be provided.

For example, the tilted surface of the magnetic pole 20 of the magnetic recording head 110 is obtained after forming a film used to form the magnetic pole 20 by performing anisotropic etching (e.g., Reactive Ion Etching (RIE)) of the film in a direction tilted with respect to the first direction. Subsequently, a film used to form the gap insulating unit 30 is formed; and the film is planarized (by, for example, Chemical Mechanical Polishing (CMP)) to be perpendicular to the first direction. The shield 10 is formed on the planarized film. Thereby, the magnetic recording head 110 is obtained.

Figure 5A:
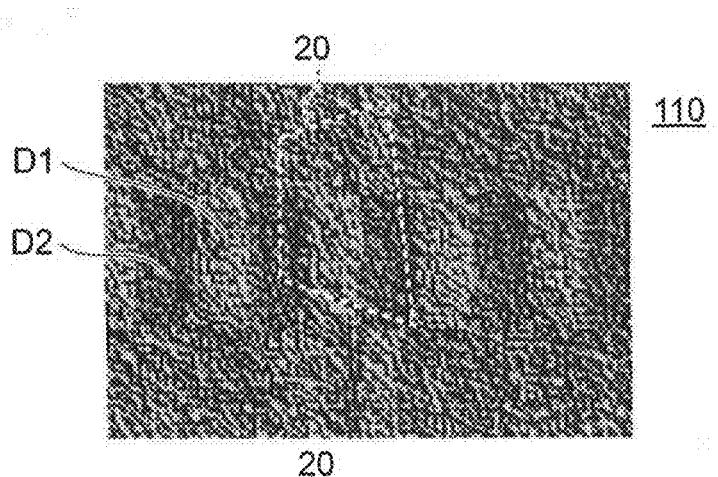
FIG. 5A and FIG. 5B are schematic views showing characteristics of the magnetic recording heads.
Figure 5B:
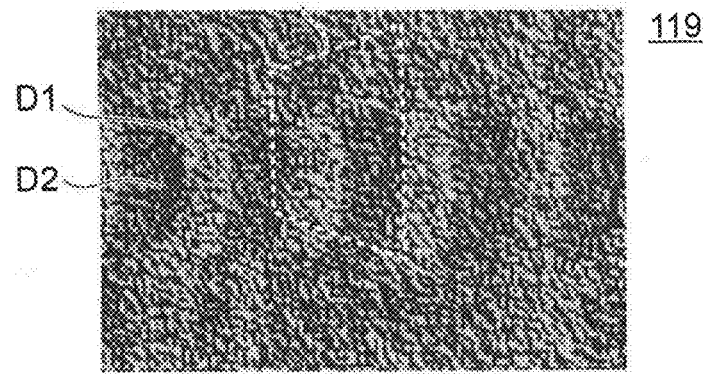

FIG. 5A and FIG. 5B are schematic views illustrating characteristics of the magnetic recording heads.

These figures illustrate the bit pattern of the magnetization 83 of the magnetic recording medium 80 to which the information is written by the magnetic recording head. FIG. 5A corresponds to the characteristics of the magnetic recording head 110 according to the embodiment. FIG. 5B corresponds to the characteristics of a magnetic recording head 119 of a reference example. In the magnetic recording head 119, the shield-opposing surface 20a of the magnetic pole 20 is not tilted with respect to the first direction. In other words, in the magnetic recording head 119, the distance between the magnetic pole 20 and the shield 10 is constant in the track width direction.

In the figures, bright portions D1 that are observed correspond to, for example, the upward direction of the magnetization 83; and dark portions D2 correspond to, for example, the downward direction of the magnetization 83. The broken lines shown in these figures illustrate the configurations of the magnetic poles 20.

In the magnetic recording head 110, the magnetic pole-opposing surface 10a of the shield 10 and the shield-opposing surface 20a of the magnetic pole 20 are planes.

In the example of the magnetic recording head 110 shown in FIG. 5A, the width wt of the magnetic pole 20 in the track width direction is 90 nanometers (nm). The first distance de is 18 nanometers; and the second distance df is 26 nanometers. On the other hand, in the magnetic recording head 119, the width wt of the magnetic pole 20 in the track width direction is 90 nm; and the first distance de and the second distance df are 22 nm.

In the magnetic recording head 119 as shown in FIG. 5B, the shapes of the bright portions D1 and the dark portions D2 are greatly curved. In other words, for the entire track width direction (the Y-axis direction), the outlines of the bright portions D1 and the dark portions D2 are greatly curved.

Conversely, in the magnetic recording head 110 according to the embodiment as shown in FIG. 5A, the curves of the bright portions D1 and the dark portions D2 are reduced. For example, the outlines of the bright portions D1 and the dark portions D2 at the central portion in the track width direction (the Y-axis direction) have substantially straight line configurations. Thus, in the magnetic recording head 110, the curved shape of the bit pattern (the bright portions D1 and the dark portions D2) formed in the magnetic recording medium 80 can be reduced.

Figure 6A:
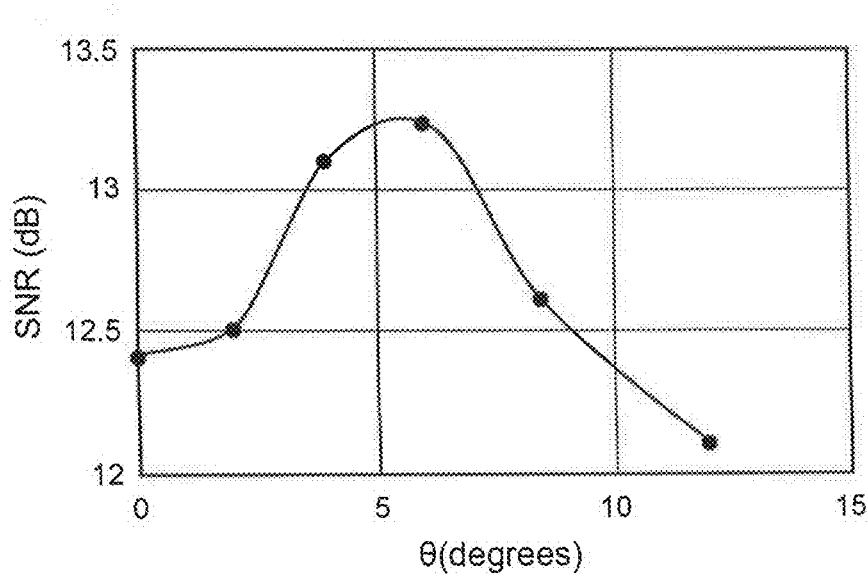
FIG. 6A and FIG. 6B are schematic views showing a characteristic of the magnetic recording head.
Figure 6B:
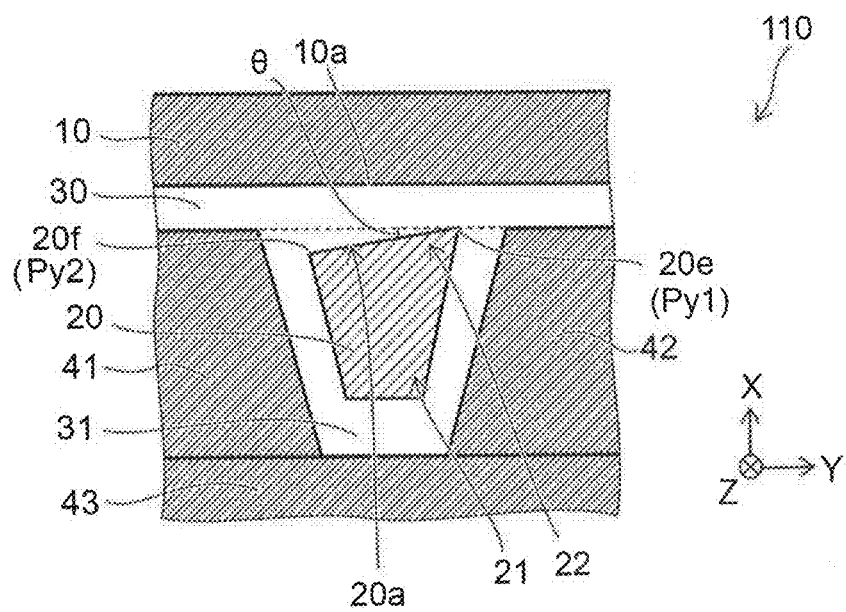

FIG. 6A and FIG. 6B are schematic views illustrating a characteristic of the magnetic recording head.

FIG. 6B is a plan view of the magnetic recording head 110. A tilt angle θ is the angle between the Z-Y plane and the shield-opposing surface 20a of the magnetic pole 20. The tilt angle θ corresponds to the angle between the plane including the shield-opposing surface 20a of the magnetic pole 20 and the plane including the magnetic pole-opposing surface 10a of the shield 10.

FIG. 6A illustrates the results of a simulation of the signal-to-noise ratio SNR when the tilt angle θ is changed. In the example, the tilt angle θ is changed in the range of 0 degrees to 12 degrees. When the tilt angle θ is 0 degrees, the shield-opposing surface 20a is not tilted and corresponds to that of the reference example.

In the simulation, the first distance de is changed as the tilt angle θ is changed. For the results shown in FIG. 6A, the first distance de that provides the maximum signal-to-noise ratio SNR is employed for each of the tilt angles θ. When the tilt angle θ is in the range of 0 degrees to 12 degrees, the first distance de is between 12 nanometers to 22 nanometers.

In FIG. 6A, the horizontal axis is the tilt angle θ (degrees). The vertical axis is the signal-to-noise ratio SNR (dB).

As shown in FIG. 6A, the tilt angle θ increases and the signal-to-noise ratio SNR increases when the tilt angle θ is in the range of more than 0 degrees but not more than about 6 degrees. When the tilt angle θ exceeds about 6 degrees, the tilt angle θ increases; and the signal-to-noise ratio SNR decreases.

When the tilt angle θ is 0 degrees, the signal-to-noise ratio SNR is about 12.4 dB. When the tilt angle is not less than 2 degrees and not more than 9 degrees, the signal-to-noise ratio SNR is 12.5 dB or more. When the tilt angle is not less than 3.5 degrees and not more than 7 degrees, the signal-to-noise ratio SNR is 13 dB or more. The signal-to-noise ratio SNR has is highest when the tilt angle is about 6 degrees.

In the embodiment, it is favorable for the tilt angle θ (the angle between the plane including the shield-opposing surface 20a and the plane including the magnetic pole-opposing surface 10a) to be not less than 2 degrees and not more than 9 degrees. It is more favorable for the tilt angle θ to be not less than 3.5 degrees and not more than 7 degrees.

Accordingly, it is favorable for the angle between the shield-opposing surface 20a and the first direction (the X-axis direction) to be not less than 81 degrees and not more than 88 degrees. It is more favorable for this angle to be not less than 83 degrees and not more than 86.5 degrees.

The signal-to-noise ratio SNR can be improved by employing such a tilt angle θ.

Thus, according to the embodiment, a high density magnetic recording head can be provided.

In the embodiment, it is favorable for the ratio of the difference between the first distance de and the second distance df to the width wt of the shield-opposing surface 20a in the track width direction to be not less than 0.03 (the tilt angle θ being about 2 degrees) and not more than 0.18 (the tilt angle θ being about 10 degrees). The improvement of the signal-to-noise ratio SNR is indistinct when the ratio is less than 0.03. When the ratio exceeds 0.18, the magnetic field concentrates too much at the edge portions; the magnetic pole unit is saturated; and the magnetic field gradient degrades.

Figure 7:
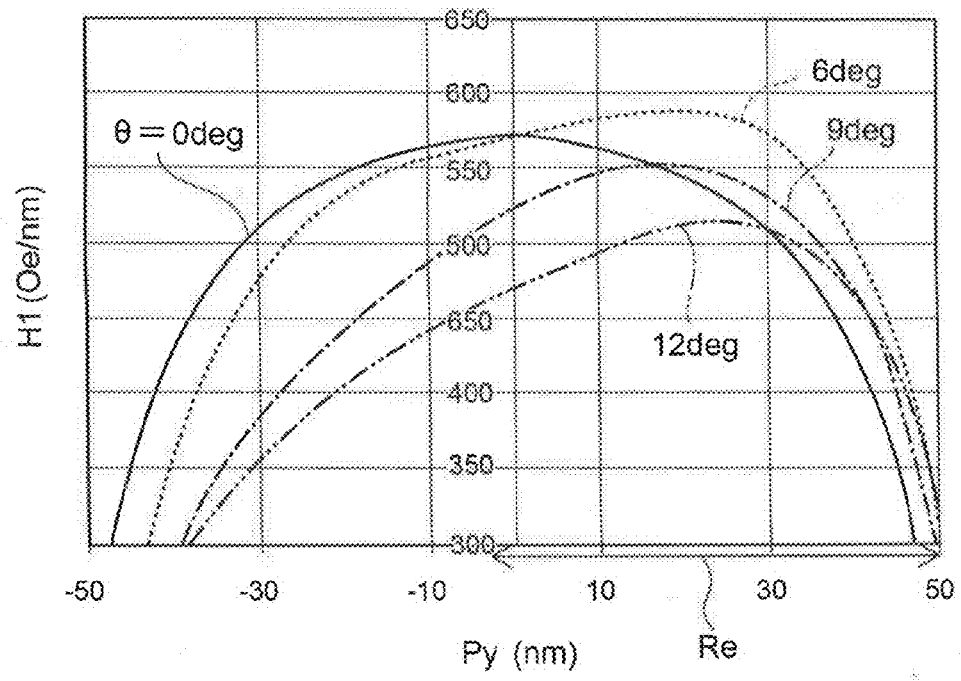
FIG. 7 is a graph of characteristics of the magnetic recording head.

FIG. 7 is a graph of characteristics of the magnetic recording head.

FIG. 7 shows distributions of the magnetic field gradient in the track width direction when changing the tilt angle θ. The horizontal axis is a position Py (nm) in the track width direction (in the example, the Y-axis direction). The vertical axis is a magnetic field gradient H1 (Oe/nm). In the example, the magnetic field gradient H1 when the magnetic field strength is 13 kOe is illustrated. A region Re which is a portion of the horizontal axis of FIG. 7 corresponds to a region where the written information remains in the shingled magnetic recording.

When the tilt angle θ is 0 degrees, the characteristic of the magnetic field gradient H1 is symmetric in the track width direction. As the tilt angle θ becomes large, the asymmetry of the magnetic field gradient H1 becomes large.

The magnetic field gradient H1 is highest when the tilt angle θ is 6 degrees. This corresponds to the signal-to-noise ratio SNR shown in FIG. 6A being highest when the tilt angle θ is about 6 degrees.

Figure 8:
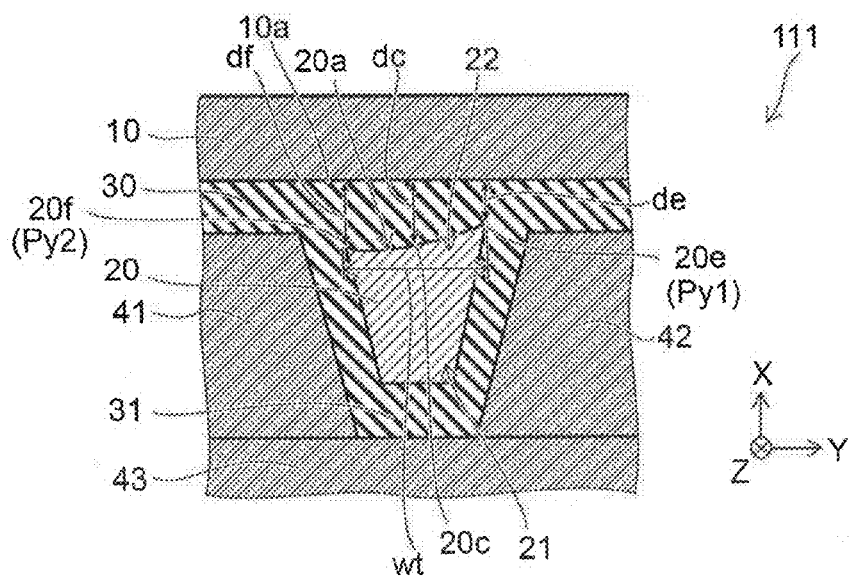
FIG. 8 is a schematic plan view showing another magnetic recording head according to the first embodiment.

FIG. 8 is a schematic plan view illustrating another magnetic recording head according to the first embodiment.

In the magnetic recording head 111 according to the embodiment as well, the shield-opposing surface 20a of the magnetic pole 20 is tilted with respect to the first direction (the X-axis direction). In the example, the shield-opposing surface 20a is a curved surface tilted with respect to the first direction.

Figure 9:
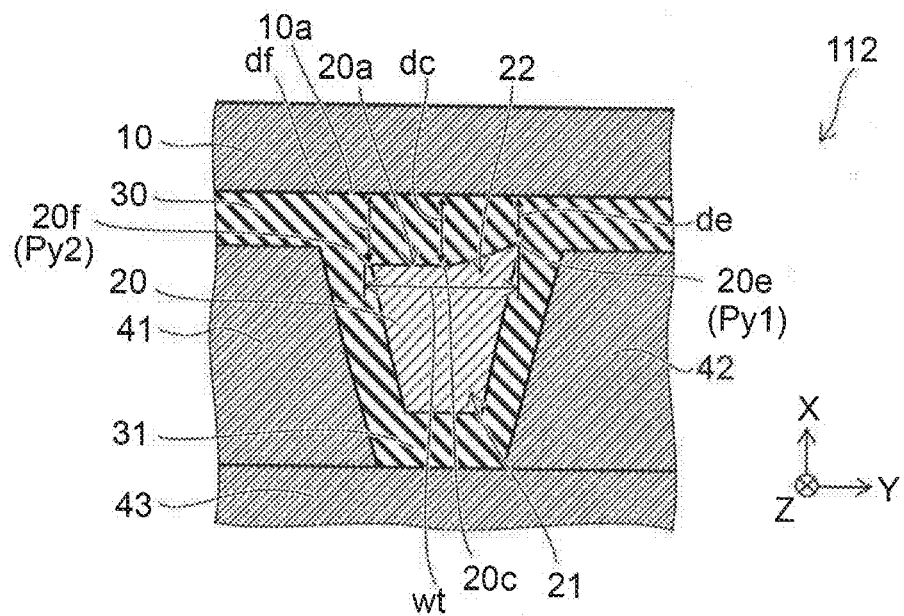
FIG. 9 is a schematic plan view showing another magnetic recording head according to the first embodiment.

FIG. 9 is a schematic plan view illustrating another magnetic recording head according to the first embodiment.

In the magnetic recording head 112 according to the embodiment, a portion of the shield-opposing surface 20a of the magnetic pole 20 is tilted with respect to the first direction (the X-axis direction). Thus, in the embodiment, the shield-opposing surface 20a includes a portion tilted with respect to the first direction.

Figure 10:
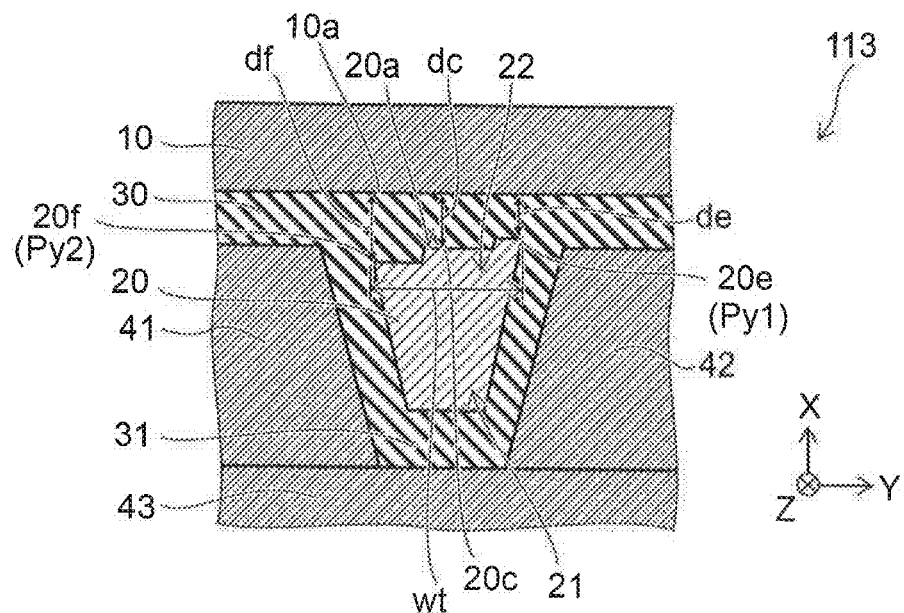
FIG. 10 is a schematic plan view showing another magnetic recording head according to the first embodiment.

FIG. 10 is a schematic plan view illustrating another magnetic recording head according to the first embodiment. In the magnetic recording head 113 according to the embodiment, the shield-opposing surface 20a of the magnetic pole 20 includes multiple stepped portions. The distance between the magnetic pole 20 and the shield 10 changes in the track width direction due to the stepped portions. In other words, the shield-opposing surface 20a as an entirety is tilted with respect to the Z-axis direction.

In the magnetic recording heads 111 to 113 recited above as well, the first distance de between the first portion 20e and the shield 10 is shorter than the second distance df between the second portion 20f and the shield 10. Thereby, a high density magnetic recording head for shingled magnetic recording can be provided.

In the embodiment recited above, the magnetic pole 20 may include, for example, an alloy having Fe and Co as major components, etc. The content of Fe is high in the alloy. The shield 10 may include, for example, an alloy having Ni and Fe as major components, etc. The first side shield 41, the second side shield 42, and the shield 43 may include, for example, an alloy having Fe, Co, and Ni as major components, etc.

Second Embodiment

The embodiment relates to a magnetic recording and reproducing device. The magnetic recording and reproducing device includes one of the magnetic recording heads according to the embodiments recited above, and the magnetic recording medium 80 having perpendicular magnetic recording to which information is recorded by the magnetic pole 20 recited above. An example of the magnetic recording and reproducing device will now be described.

Figure 11:
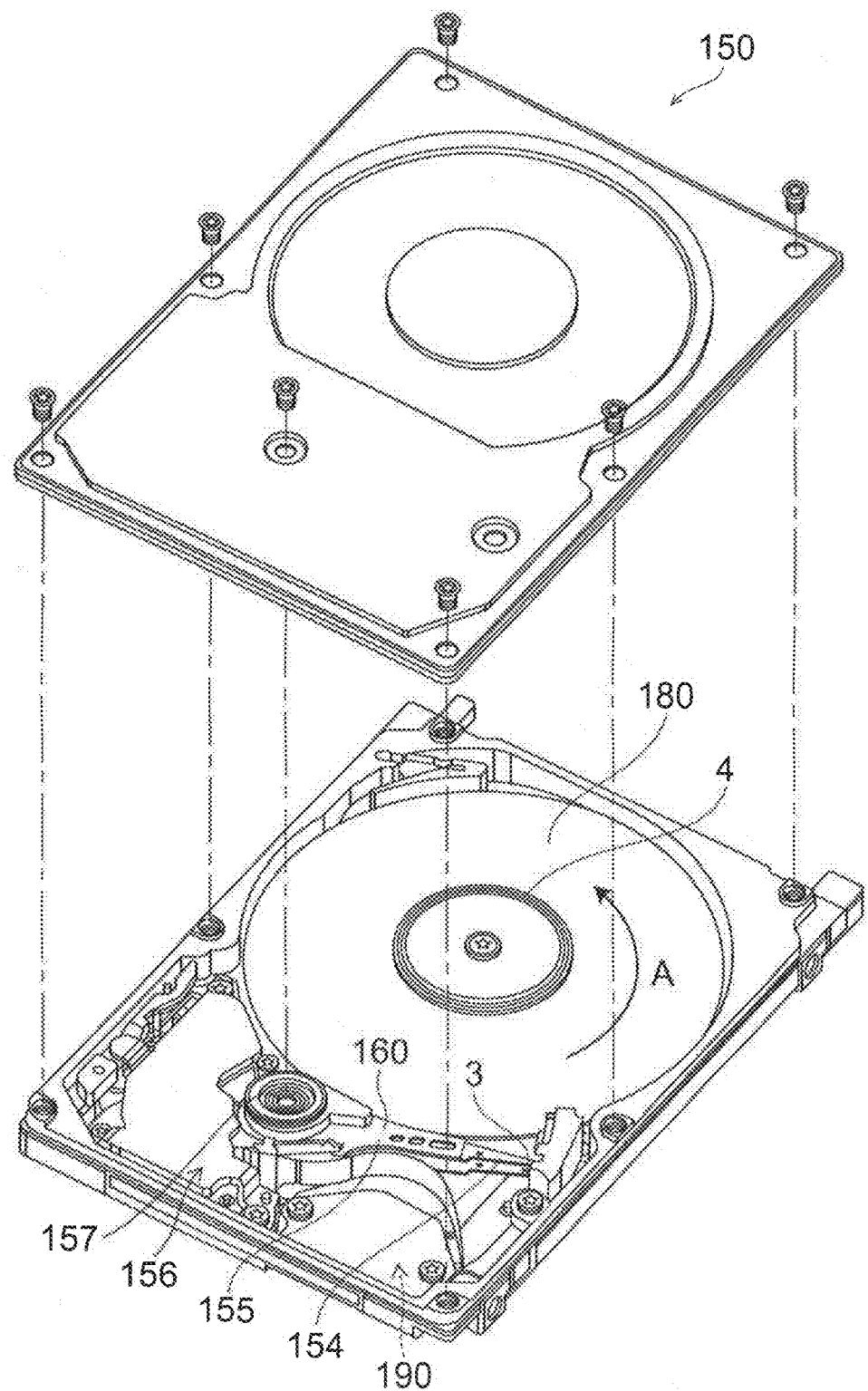
FIG. 11 is a schematic perspective view showing the magnetic recording and reproducing device according to the second embodiment.

FIG. 11 is a schematic perspective view illustrating the magnetic recording and reproducing device according to the second embodiment.

Figure 12A:
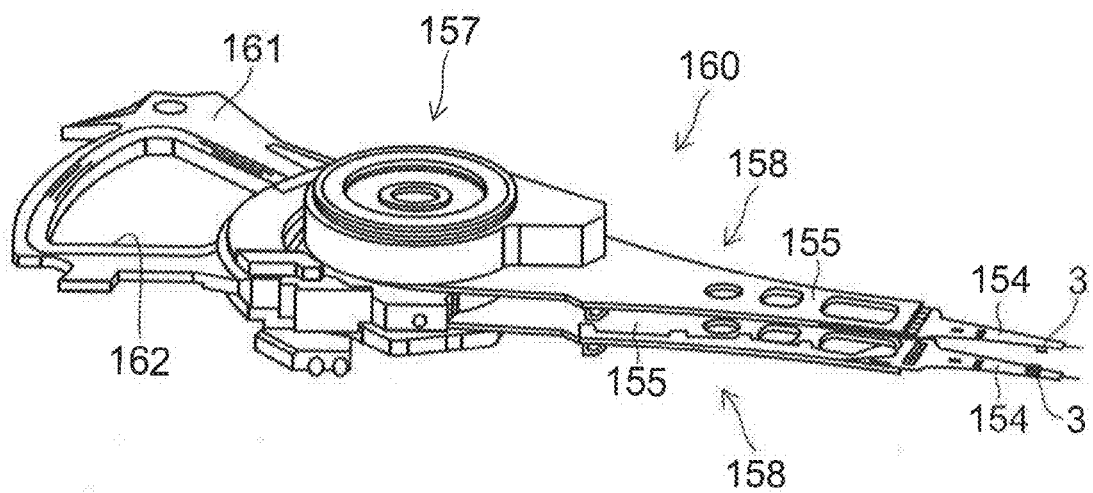
FIG. 12A and FIG. 12B are schematic perspective views showing portions of the magnetic recording and reproducing device according to the second embodiment.
Figure 12B:
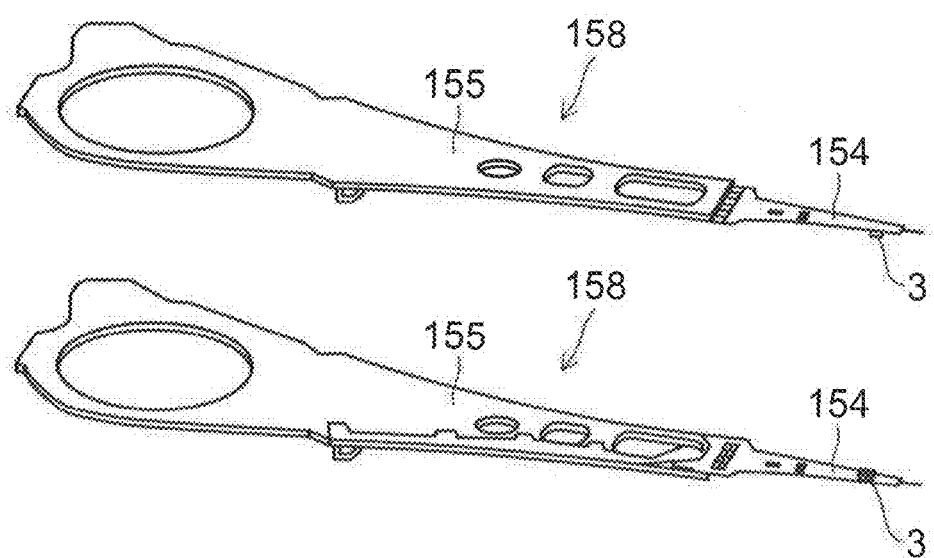

FIG. 12A and FIG. 12B are schematic perspective views illustrating portions of the magnetic recording and reproducing device according to the second embodiment.

As shown in FIG. 11, the magnetic recording and reproducing device 150 according to the embodiment is a device that uses a rotary actuator. A recording medium disk 180 is mounted to a spindle motor 4 and is rotated in the direction of arrow A by a motor that responds to a control signal from a drive device controller. The magnetic recording and reproducing device 150 according to the embodiment may include multiple recording medium disks 180. The magnetic recording and reproducing device 150 may include a recording medium 181. For example, the magnetic recording and reproducing device 150 is a hybrid HDD (Hard Disk Drive). The recording medium 181 is, for example, a SSD (Solid State Drive). The recording medium 181 includes, for example, nonvolatile memory such as flash memory, etc.

A head slider 3 that performs the recording/reproducing of the information stored in the recording medium disk 180 has a configuration such as that described above and is mounted to the tip of a suspension 154 having a thin-film configuration. Here, for example, one of the magnetic recording heads according to the embodiments described above is mounted at the tip vicinity of the head slider 3.

When the recording medium disk 180 rotates, the medium-opposing surface (the ABS) of the head slider 3 is held at a prescribed fly height from the surface of the recording medium disk 180 by the balance between the downward pressure due to the suspension 154 and the pressure generated by the medium-opposing surface of the head slider 3. A so-called "contact-sliding" head slider 3 that contacts the recording medium disk 180 may be used.

The suspension 154 is connected to one end of an actuator arm 155 that includes a bobbin unit holding a drive coil, etc. A voice coil motor 156 which is one type of linear motor is provided at one other end of the actuator arm 155. The voice coil motor 156 may include a drive coil that is wound onto the bobbin unit of the actuator arm 155, and a magnetic circuit made of a permanent magnet and an opposing yoke that are disposed to oppose each other with the coil interposed. The suspension 154 has one end and one other end; the magnetic recording head is mounted to the one end of the suspension 154; and the actuator arm 155 is connected to the one other end of the suspension 154.

The actuator arm 155 is held by ball bearings provided at two locations on and under a bearing unit 157; and the actuator arm 155 can be caused to rotate and slide unrestrictedly by the voice coil motor 156. As a result, the magnetic recording head is movable to any position of the recording medium disk 180.

FIG. 12A illustrates the configuration of a portion of the magnetic recording and reproducing device and is an enlarged perspective view of a head stack assembly 160.

FIG. 12B is a perspective view illustrating a magnetic recording head assembly (a head gimbal assembly (HGA)) 158 which is a portion of the head stack assembly 160.

As shown in FIG. 12A, the head stack assembly 160 includes the bearing unit 157, the head gimbal assembly 158 that extends from the bearing unit 157, and a support frame 161 that extends from the bearing unit 157 in the opposite direction of the HGA and supports a coil 162 of the voice coil motor.

As shown in FIG. 12B, the head gimbal assembly 158 includes the actuator arm 155 that extends from the bearing unit 157, and the suspension 154 that extends from the actuator arm 155.

The head slider 3 is mounted to the tip of the suspension 154. One of the magnetic recording heads according to the embodiments is mounted to the head slider 3.

In other words, the magnetic head assembly (the head gimbal assembly) 158 according to the embodiment includes the magnetic recording head according to the embodiment, the head slider 3 to which the magnetic recording head is mounted, the suspension 154 that has the head slider 3 mounted to the one end, and the actuator arm 155 that is connected to the one other end of the suspension 154.

The suspension 154 includes, for example, lead wires (not shown) that are for writing and reproducing signals, for a heater that adjusts the fly height, for a spin torque oscillator, etc. The lead wires are electrically connected to electrodes of the magnetic recording head embedded in the head slider 3.

A signal processor 190 is provided to write and reproduce the signals to and from the magnetic recording medium by using the magnetic recording head. For example, the signal processor 190 is provided on the backside of the drawing of the magnetic recording and reproducing device 150 illustrated in FIG. 11. The input/output lines of the signal processor 190 are electrically connected to the magnetic recording head by being connected to electrode pads of the head gimbal assembly 158.

Thus, the magnetic recording and reproducing device 150 according to the embodiment includes a magnetic recording medium, the magnetic recording head according to the embodiment recited above, a movable unit that is relatively movable in a state in which the magnetic recording medium and the magnetic recording head are separated from each other or in contact with each other, a position controller that aligns the magnetic recording head at a prescribed recording position of the magnetic recording medium, and a signal processor that writes and reproduces the signals to and from the magnetic recording medium by using the magnetic recording head.

In other words, the recording medium disk 180 is used as the magnetic recording medium recited above.

The movable unit recited above may include the head slider 3.

The position controller recited above may include the head gimbal assembly 158.

Thus, the magnetic recording and reproducing device 150 according to the embodiment includes a magnetic recording medium, the magnetic head assembly according to the embodiment, and a signal processor that writes and reproduces signals to and from the magnetic recording medium by using a magnetic recording head mounted to the magnetic head assembly.

According to the embodiment, a high density magnetic recording head and magnetic recording and reproducing device are provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording heads such as shields, magnetic poles and side shields, and included in magnetic recording and reproducing device such as magnetic recording mediums, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording heads and magnetic recording and reproducing devices practicable by an appropriate design modification by one skilled in the art based on the magnetic recording heads and the magnetic recording and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and theft equivalents are intended to cover such forms or modifications as would fall within the scope and spirit of the invention.

What is claimed is:

1. A magnetic recording head, comprising:
a magnetic pole; and
a shield opposing the magnetic pole,
the magnetic recording head recording information in a magnetic recording medium by shingled magnetic recording,
the magnetic pole having a shield-opposing surface opposing the shield,
the shield-opposing surface including a first portion and a second portion,
a position of the second portion in a track width direction being different from a position of the first portion in the track width direction, the track width direction intersecting a first direction from the magnetic pole toward the shield,
the first portion recording the information in the magnetic recording medium after the second portion in the shingled magnetic recording,
a first distance between the first portion and the shield being shorter than a second distance between the second portion and the shield,
the shield-opposing surface being tilted with respect to the first direction,
wherein a ratio of a difference between the first distance and the second distance to a width in the track width direction of the shield-opposing surface is not less than 0.03 and not more than 0.18.

2. The head according to claim 1, wherein the first portion includes one end in the track width direction.

3. The head according to claim 1, wherein an angle between the shield-opposing surface and the first direction is not less than 81 degrees and not more than 88 degrees.

4. The head according to claim 1, wherein an angle between the shield-opposing surface and the first direction is not less than 83 degrees and not more than 86.5 degrees.

5. The head according to claim 1, wherein the shield-opposing surface is a plane.

6. The head according to claim 1, wherein the shield-opposing surface is a curved surface tilted with respect to the first direction.

7. The head according to claim 1, wherein the shield-opposing surface includes a plurality of stepped portions.

8. The head according to claim 1, wherein
the magnetic pole includes a first end region, and a second end region provided between the first end region and the shield, and
a width in the track width direction of the second end region is wider than a width in the track width direction of the first end region.

9. The head according to claim 1, wherein the shield is a trailing shield.

10. A magnetic recording head, comprising:
a magnetic pole; and
a shield opposing the magnetic pole,
the magnetic recording head recording information in a magnetic recording medium,
the magnetic pole having a shield-opposing surface opposing the shield,
the shield-opposing surface including a first portion and a second portion,
a position of the second portion in a track width direction being different from a position of the first portion in the track width direction, the track width direction intersecting a first direction from the magnetic pole toward the shield,
the magnetic recording medium including first to third regions arranged in the track width direction, the second region being disposed between the first region and the third region,
the magnetic pole controlling a direction of a magnetization of the first region by the first portion opposing the first region at a first time,
the magnetic pole controlling a direction of a magnetization of the second region by the second portion opposing the second region at the first time,
the magnetic pole controlling the direction of the magnetization of the second region by the first portion opposing the second region at a second time after the first time,
the magnetic pole controlling a direction of a magnetization of the third region by the second portion opposing the third region at the second time,
a first distance between the first portion and the shield being shorter than a second distance between the second portion and the shield,
the shield-opposing surface being tilted with respect to the first direction.

11. The head according to claim 10, wherein a ratio of a difference between the first distance and the second distance to a width in the track width direction of the shield-opposing surface is not less than 0.03 and not more than 0.18.

12. The head according to claim 10, wherein the first portion includes one end in the track width direction.

13. The head according to claim 10, wherein an angle between the shield-opposing surface and the first direction is not less than 81 degrees and not more than 88 degrees.

14. The head according to claim 10, wherein
the shield has a magnetic pole-opposing surface opposing the magnetic pole, and
the magnetic pole-opposing surface is perpendicular to the first direction.

15. A magnetic recording head, comprising:
a magnetic pole; and
a shield opposing the magnetic pole,
the magnetic recording head recording information in a magnetic recording medium by shingled magnetic recording,
the magnetic pole having a shield-opposing surface opposing the shield,
the shield-opposing surface including a first portion and a second portion,
a position of the second portion in a track width direction being different from a position of the first portion in the track width direction, the track width direction intersecting a first direction from the magnetic pole toward the shield,
the first portion recording the information in the magnetic recording medium after the second portion in the shingled magnetic recording,
a first distance between the first portion and the shield being shorter than a second distance between the second portion and the shield,
the shield-opposing surface being tilted with respect to the first direction, wherein
the shield has a magnetic pole-opposing surface opposing the magnetic pole, and
the magnetic pole-opposing surface is perpendicular to the first direction.

16. The head according to claim 15, wherein the magnetic pole-opposing surface is a plane.

17. The head according to claim 15, wherein an angle between a plane including the shield-opposing surface and a plane including the magnetic pole-opposing surface is not less than 2 degrees and not more than 9 degrees.

18. The head according to claim 15, wherein an angle between a plane including the shield-opposing surface and a plane including the magnetic pole-opposing surface is not less than 3.5 degrees and not more than 7 degrees.

19. A magnetic recording and reproducing device, comprising:
- a magnetic recording head; and
- a magnetic recording medium,
- the magnetic recording medium being a perpendicular magnetic recording medium
- the magnetic recording head including:
  - a magnetic pole; and
  - a shield opposing the magnetic pole,
  - the magnetic recording head recording information in a magnetic recording medium by shingled magnetic recording,
  - the magnetic pole having a shield-opposing surface opposing the shield,
  - the shield-opposing surface including a first portion and a second portion,
  - a position of the second portion in a track width direction being different from a position of the first portion in the track width direction, the track width direction intersecting a first direction from the magnetic pole toward the shield,
  - the first portion recording the information in the magnetic recording medium after the second portion in the shingled magnetic recording,
  - a first distance between the first portion and the shield being shorter than a second distance between the second portion and the shield,
- the shield-opposing surface being tilted with respect to the first direction,
- wherein a ratio of a difference between the first distance and the second distance to a width in the track width direction of the shield-opposing surface is not less than 0.03 and not more than 0.18.

* * * * *